April 26, 1927.                F. E. COATSWORTH                1,626,394
INCUBATOR TRAY
Filed June 29, 1926
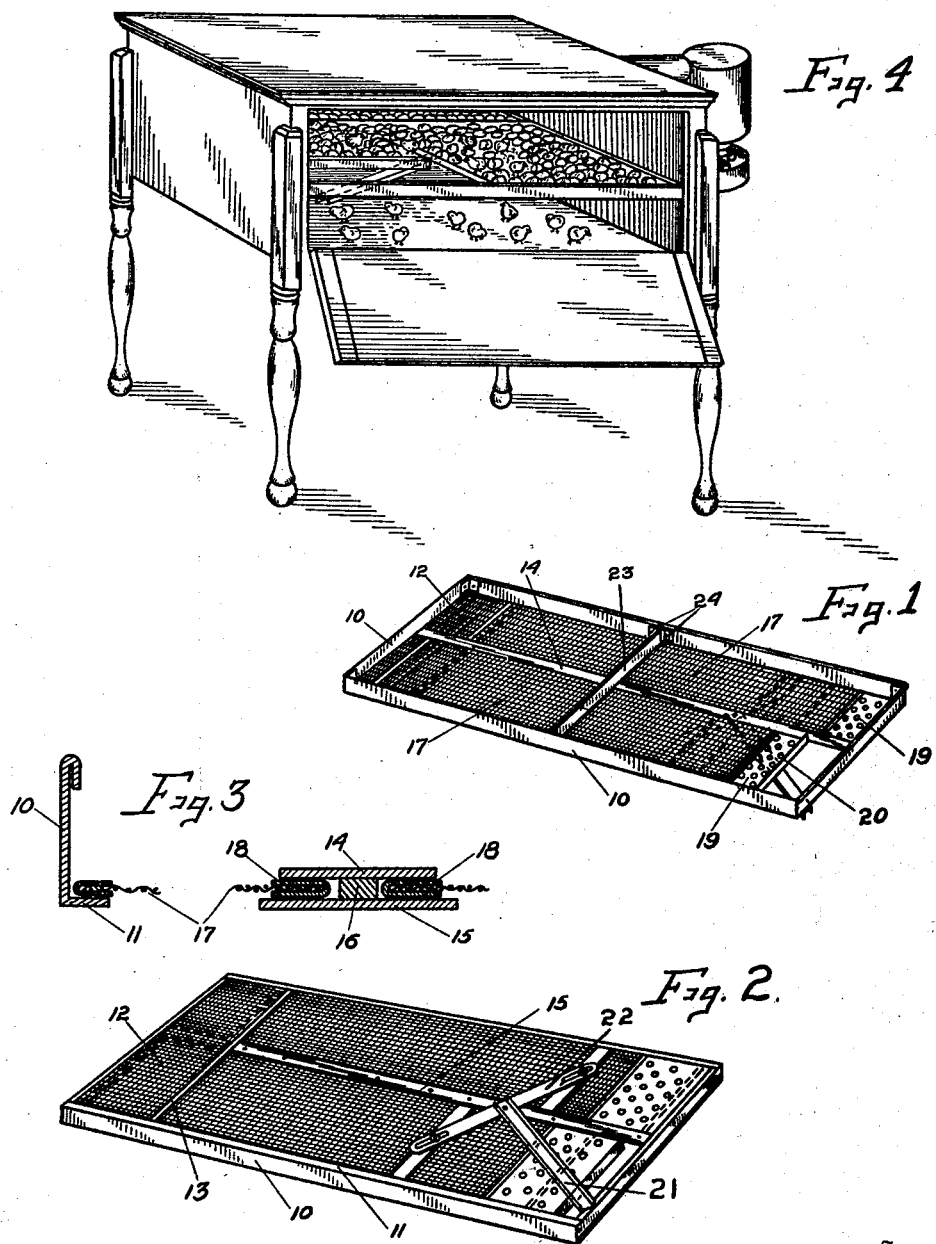

Patented Apr. 26, 1927.

1,626,394

UNITED STATES PATENT OFFICE.

FRANK E. COATSWORTH, OF LINCOLN, NEBRASKA.

INCUBATOR TRAY.

Application filed June 29, 1926. Serial No. 119,380.

My invention relates to egg trays for use in incubators and its primary object is the provision of an egg tray having means for turning the eggs. Especially is it my object to provide an egg turning device which is of extreme simplicity in construction, which is reliable in action and which has no parts which are apt to bind or slip, and which may be manipulated by a slight pressure on a lever conveniently positioned at the door of the incubator. Among the other objects of my invention is the provision of an egg tray in which the problems of ventilation are well taken care of, and in which there is an opening with a slidable closure, the opening permitting the chicks to leave the tray after they have been hatched.

Having in view these objects and others which will be mentioned in the following description, I will now refer to the drawings, in which—

Figure 1 is a view in perspective of the egg tray as it appears when looking at its upper or open side.

Figure 2 is a perspective view of the under side of the egg tray.

Figure 3 is a broken transverse sectional view of a portion of the egg tray.

Figure 4 is a view in perspective of an incubator showing the application of the egg tray.

The egg tray is rectangular in shape, its frame being made from any suitable material, preferably sheet steel which has been bent into angle form. The upper portion 10 is at the sides and ends of the tray while the horizontal portion 11 constitutes an inwardly directed flange at the bottom of the tray. At the far end of the tray the bottom is permanently closed by means of the screen 12, the bar 13 constituting a support for the edge of the screen and a brace for the tray. The tray is divided longitudinally into two parts by the upper strip 14 extending from end to end and the lower strip 15 extending only to the bar 13, the strip 16 separating the strips 14 and 15.

The tray is provided with sliding bottoms 17 for its two portions. These bottoms consist of screen or similar material, the edges of which are bound in strips of sheet metal which are crimped into U form, as shown in Figure 3. Each bottom 17 is slidable lengthwise of the tray, the inner edges 18 being positioned within the spaces between strips 14 and 15. The bottoms 17 are of a length equal to the distance between the near end of the tray and the bar 13 so that when they are slid back, the front portion of the tray is open at the bottom to a width equal to that of the screen 12. Both portions of this open space are closed by means of perforated sheet metal strips 19 having their near edge bent upwardly at 20. The perforated bottoms 19 are also slidable lengthwise of the tray, their movement being limited by the upturned flange 20 coming in contact with the near edge of the bottom 17.

For convenient actuation of the two bottoms 17 there is provided a T-shaped lever as shown in Figure 2. The lever has a handle portion 21 rigidly secured to a double lever 22. It is pivoted at the junction of the parts 21 and 22 to the strip 15 and on the under side of the tray. The two lever arms 22 are each connected at their outer extremities to a bottom 17, the connection being pivotal and slidable as shown in Figure 2. The result is that when the lever 21 is actuated, both bottoms 17 will be moved longitudinally of the tray and in opposite directions.

The bottoms 17 may be made from any suitable material which provides the necessary frictional engagement with the eggs and which provides for sufficient ventilation. The same thing is true of the slides 19 although in this case it is not so necessary that the eggs be held frictionally.

The operation and advantages will be readily apparent from the foregoing description taken in connection with the drawings. The tray may be completely filled with eggs and placed in the incubator. At periodic intervals it becomes necessary to turn all the eggs and at such times it is simply necessary to move the lever 21 from one extreme position to the other. This is easily done because the end of the lever 21 is in the most convenient position when the door of the incubator is opened. The moving of the lever 21 moves the bottoms 17 in opposite directions and thus turns all the eggs in the tray. The turning of the eggs is caused not only by the movement of the bottoms, but is due also to the fact that the eggs are prevented from being moved bodily because of the abutments at the ends of the tray. After the eggs have been tested and the infertile ones discarded, the tray may be only partly full so that the mere movement of the bottoms 17 will not turn the eggs. The partition 23 is therefore provided to serve as an abutment when the tray is only partly filled. The partition 23 is readily removable as it is slidable into and out of guideways 24 in the side walls of the tray. It should be understood, however, that while only one partition 23 is shown in the drawings, two or more partitions with guideways may be provided in order to reduce the compartment of the tray to the desired size. The partitions 23 are also useful when it is desired to hatch less than a full tray of eggs. The incubation of the eggs is then continued with periodic turning of the eggs until the chicks are due to emerge, at which time one of the slides 19 is moved rearwardly to leave an opening in the bottom of the tray for the chicks to fall through.

The construction which I have shown and described is, of course, susceptible of considerable variation without departing from the spirit and scope of my invention. The fixed bottom 12 may, for example, be replaced by a pair of slides similar to the slides 19, and in special instances such construction would have advantages over the form hereinbefore described. Exits for the chicks would thus be provided at diagonally opposite corners of the tray.

Having thus described my invention in such full, clear, and exact terms that its construction and utility will be readily understood by others skilled in the art to which it pertains, what I claim as new and desire to secure by Letters Patent of the United States is:

1. An egg tray, a median longitudinal strap secured to said egg tray on the under side thereof, a pair of reticulated bottoms for said egg tray, said bottoms being slidably secured to said median strap and on opposite sides thereof, means for preventing the eggs from falling from the ends of the bottom sections and means pivotally secured to said median strap for simultaneously moving said bottoms in opposite directions.

2. An egg tray, a transverse strap secured to said egg tray on the under side thereof, a fixed reticulated bottom secured to said transverse strap and to said egg tray at its far extremity, a median longitudinal strap on the under side of said egg tray and extending from said transverse strap to the near extremity of said egg tray, a pair of reticulated bottoms slidably secured to said longitudinal strap and on opposite sides thereof, means for preventing the eggs from falling from the ends of the bottom sections and means pivotally secured to said longitudinal strap for simultaneously moving said two bottoms in opposite directions.

3. An egg tray, a median longitudinal strap secured thereto at the under side thereof, a pair of reticulated bottoms slidably secured to said strap and on opposite sides thereof, a lever pivotally secured to said strap and projecting in both directions from its pivot, means for preventing the eggs from falling from the ends of the bottom sections and slidable pivotal connections between said slidable bottoms and the ends of said lever whereby movement of said lever will cause said two slidable bottoms to move simultaneously in opposite directions.

4. An egg tray, a median longitudinal strap secured thereto at the under side thereof, a pair of reticulated bottoms slidably secured to said strap and on opposite sides thereof, means for preventing the eggs from falling from the ends of the bottom sections, a lever pivotally secured to said strap and projecting in both directions from its pivot, each of said bottoms having a downwardly projecting pin secured thereto, said lever being provided at its extremities with elongated apertures for slidably and pivotally receiving said pins, and a handle for actuating said lever, said handle having its outer extremity positioned immediately under the edge of said egg tray.

5. An egg tray having a fixed reticulated bottom at its far end portion, a median longitudinal strap secured to said egg tray, a pair of reticulated bottoms secured to said strap, said pair of bottoms being slidable over said fixed bottom, means for simultaneously sliding said two bottoms in opposite directions, and a pair of independently slidable bottoms at the near end of said egg tray whereby either of said last named bottoms may be moved to opening position to permit the chicks to fall out of the egg tray.

6. An egg tray, a pair of reticulated bottom sections therefor, said bottom sections being slidably secured to said egg tray and positioned side by side, means for simultaneously moving said pair of bottom sections in opposite directions, and stationary bottom sections at each end of the reticulated bottom sections.

7. An egg tray, a pair of reticulated bottom sections therefor, said bottom sections being slidably secured to said egg tray and positioned side by side, means for preventing the eggs from falling from the ends of the reticulated bottom sections, and means for simultaneously moving said pair of reticulated bottom sections in opposite directions.

In testimony whereof I affix my signature.

FRANK E. COATSWORTH.